United States Patent [19]

O'Connor et al.

[11] Patent Number: 4,761,871

[45] Date of Patent: Aug. 9, 1988

[54] METHOD OF JOINING TWO THERMOPLASTIC ARTICLES

[75] Inventors: James E. O'Connor; William B. Beaulieu, both of Bartlesville, Okla.

[73] Assignee: Phillips Petroleum Company, Bartlesville, Okla.

[21] Appl. No.: 933,762

[22] Filed: Nov. 21, 1986

[51] Int. Cl.⁴ .............................................. B32B 7/08
[52] U.S. Cl. ................................. 29/432.1; 29/432.2; 29/525.1; 29/525.2; 156/92; 264/23; 264/154; 264/249
[58] Field of Search ..................... 29/432.1, 432.2, 514, 29/526 R, 526 A; 156/91, 92; 264/1.4, 23, 25, 154, 249; 411/43, 82, 258, 360, 501, 506, 908, 930

[56] References Cited

U.S. PATENT DOCUMENTS

| | | | |
|---|---|---|---|
| 2,458,152 | 1/1949 | Eakins | 156/92 X |
| 2,510,693 | 6/1950 | Green | 411/501 |
| 2,685,813 | 8/1954 | Lampman et al. | 29/526 |
| 3,184,353 | 5/1965 | Balamuth et al. | 29/526 |
| 3,320,106 | 5/1967 | Kirkpatrick et al. | 156/91 X |
| 3,367,809 | 2/1968 | Soloff | 156/91 X |
| 3,436,803 | 4/1969 | Sarnoff | 29/432.2 |
| 3,499,808 | 3/1970 | Obeda | 156/73 |
| 3,837,985 | 9/1974 | Chase | 156/92 X |
| 3,879,063 | 4/1975 | de Man | 264/249 X |
| 4,281,785 | 8/1981 | Brooks . | |
| 4,478,544 | 10/1984 | Strand | 411/34 |
| 4,478,661 | 10/1984 | Lewis | 156/92 |
| 4,490,083 | 12/1984 | Rebish | 411/338 |
| 4,582,236 | 4/1986 | Hirose | 327/67 |

FOREIGN PATENT DOCUMENTS

| | | | |
|---|---|---|---|
| 101878 | 8/1979 | Japan | 264/23 |
| 58-59033 | 4/1983 | Japan | 264/249 |
| 84-298110/48 | 10/1984 | Japan . | |

OTHER PUBLICATIONS

European Patent Application No. 125,472 published Nov. 21, 1984.
A brochure of Polymer Composites, Inc. titled "Fiberod TM—Advanced Composite Reinforced Thermoplastics".
An advertisement of Northern Petrochemical Company entitled "Tough As Nails".

Primary Examiner—P. W. Echols
Assistant Examiner—Andrew E. Rawlins
Attorney, Agent, or Firm—Laney, Dougherty, Hessin & Beavers

[57] ABSTRACT

Methods and fasteners are provided for joining thermoplastic articles and for connecting a single thermoplastic article to a non-thermoplastic substrate. A first thermoplastic article and a second thermoplastic article can be placed against each other, and then localized adjacent portions of the articles are heated preferably with an ultrasonic heating device. A sharpened end of a thermoplastic fastener is driven through the heated areas of the first thermoplastic article and the second thermoplastic article. Upon cooling of the heated areas of the first thermoplastic article and the second thermoplastic article, those articles are locked to the thermoplastic fastener by fusion of the contacting surfaces of the articles and fastener.

26 Claims, 2 Drawing Sheets

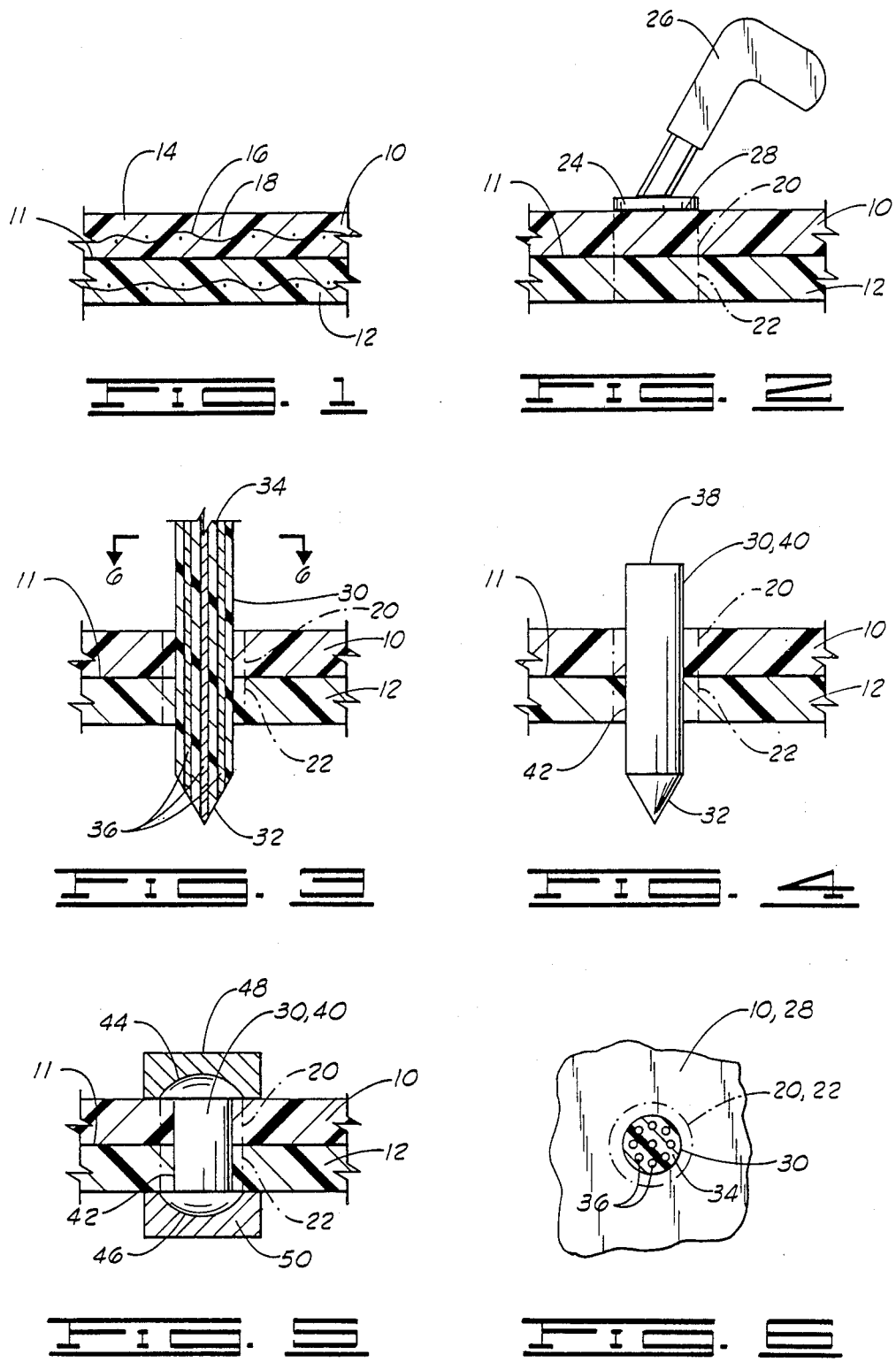

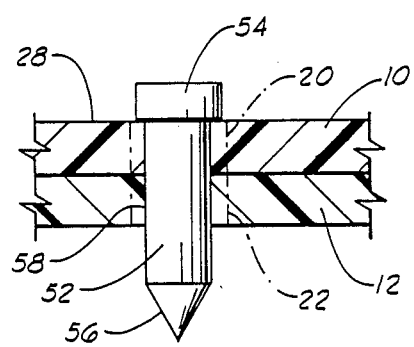
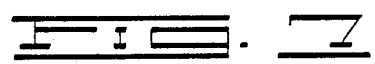
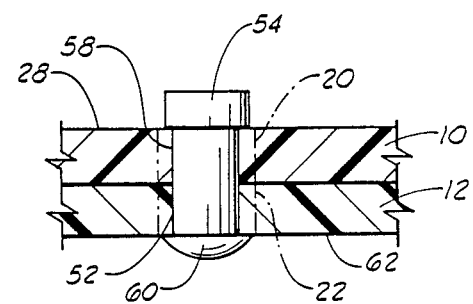
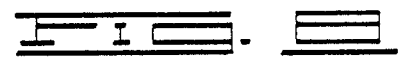
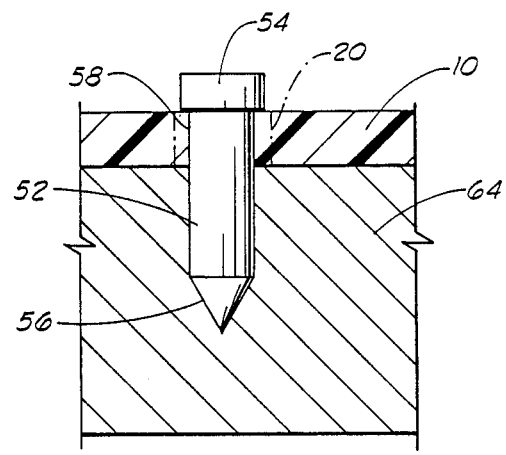
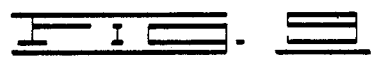
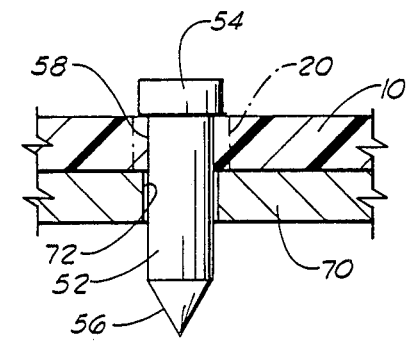
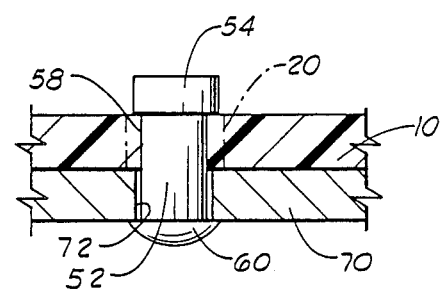
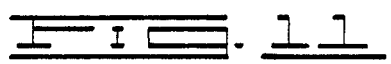

METHOD OF JOINING TWO THERMOPLASTIC ARTICLES

BACKGROUND OF THE INVENTION

1. Field of the Invention

The invention relates to thermoplastic fasteners for joining articles, and particularly to fiber reinforced thermoplastic composite fasteners.

2. Description of the Prior Art

The prior art includes a number of plastic fasteners which are utilized in combination with heat to join articles. Some of these fasteners include fiber reinforcing materials.

For example, U.S. Pat. No. 4,478,544 to Strand discloses a composite rivet having a thermoset matrix with carbon fiber reinforcing. The rivet is placed through preformed holes in two sheets which are to be joined, and then an enlarged head is formed on the rivet by the application of heat and pressure.

It is also known that plastic fasteners can be deformed through the use of ultrasonic heating devices, as shown in U.S. Pat. No. 3,499,808 to Obeda.

The art includes sharpened plastic fasteners such as staples, as seen in U.S. Pat. No. 4,281,785 to Brooks. The plastic staples of Brooks are not reinforced. The staples are driven through layers of fabric and then heated to join the two legs of the staple and hold the same in place.

U.S. Pat. No. 4,478,661 to Lewis discloses the use of thermoplastic thread or thermoplastic staples to join thermoplastic sheets.

U.S. Pat. No. 4,582,236 to Hirose discloses the use of synthetic resin tacks or staples which are driven through preformed holes in adjacent sheets of material and then heated to form rivet heads.

In all of the examples discussed above, the fastener is either placed through a preformed aperture, or a sharpened fastener is driven through a relatively pliable material without the prior application of any heat. The methods described in the cited references are not suitable for joining articles where one of the articles is a thermoplastic article which does not have a preformed aperture for receiving the fastener and which is of sufficient thickness and strength that a fastener cannot be readily driven therethrough. The present invention, however, provides methods and fasteners directed to just such a situation.

SUMMARY OF THE INVENTION

The fastening of fiber reinforced composites for the aerospace industry requires fasteners and fastening methods that provide light weight, high shear resistance and a low stress on the composite. The instant invention provides a fiber reinforced rivet or nail and method of use that provides the desired characteristics. Additionally, the rivet may be locked in place by a fusion bond with the composite material.

The method in one preferred embodiment includes the steps of placing a first thermoplastic article against a second thermoplastic article, and then heating adjacent portions of the first and second articles. Then a sharpened end of a thermoplastic fastener is driven through the heated areas of the first and second articles and the heated areas are then allowed to cool thus locking the fastener to the first and second articles. The semi-molten heated areas of the first and second articles fuse to the thermoplastic fastener upon cooling of the heated areas, even if no additional heat is applied to the ends of the fastener to form an enlarged head or the like. The method can, however, also include steps of subsequently heating the ends of the fastener and forming enlarged heads thereon.

The fastener itself is preferably a fiber reinforced fastener which includes a plurality of continuous substantially parallel reinforcing filaments in a matrix of thermoplastic material defining an elongated shape sharpened at one end thereof.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIGS. 1-5 represent a sequential series of steps illustrating the methods of the present invention.

FIG. 1 is a schematic sectioned elevation view of first and second fiber reinforced thermoplastic sheets laid one upon the other.

FIG. 2 shows an ultrasonic heating device placed against the upper one of the two sheets of FIG. 1 to form heated portions in the first and second thermoplastic sheets as shown in phantom lines.

In FIG. 3, a sharpened elongated rod of fiber reinforced thermoplastic material has been driven through the heated portions of the thermoplastic sheets.

In FIG. 4, the rod has been severed a short distance above the upper sheet to define a severed fastener.

In FIG. 5, the ends of the fastener of FIG. 4 have been heated and molded to form enlarged heads.

FIG. 6 is a plan sectioned view taken along lines 6—6 of FIG. 3 showing the location of the fastener in the center of the circular heated portions.

FIGS. 7 and 8 are similar to FIGS. 4 and 5 and represent an alternative embodiment of the present invention.

In FIG. 7, a thermoplastic nail or rivet with an enlarged head on one end and a sharpened point on the other end has been driven through the heated portions of the two thermoplastic sheets.

In FIG. 8, the sharpened lower end of the nail of FIG. 7 has been heated and formed into an enlarged head adjacent the lower sheet of thermoplastic material.

FIG. 9 shows another alternative embodiment of the present invention wherein a single layer of thermoplastic material has been connected to a non-thermoplastic underlying substrate.

FIGS. 10 and 11 are similar to FIGS. 4 and 5 and represent another alternative embodiment of the present invention.

In FIG. 10, a thermoplastic nail or rivet with an enlarged head on one end and a sharpened point on the other end has been driven through the heated portion of an upper thermoplastic sheet, and through a preformed aperture in a lower metallic sheet.

In FIG. 11, the sharpened lower end of the nail of FIG. 10 has been heated and formed into an enlarged head adjacent the lower sheet of metallic material.

DETAILED DESCRIPTION OF THE PREFERRED EMBODIMENTS

Referring now to FIGS. 1-5, the preferred method of joining thermoplastic articles in accordance with the present invention will be described.

In FIG. 1, a first sheet of fiber reinforced thermoplastic material 10 has been laid upon a second sheet 12 which can be thermoplastic or another material such as metal. The sheets 10 and 12 may be generally referred to as first and second articles. An interface 11 is defined where sheet 10 engages sheet 12.

If desired, each of the sheets such as sheet 10 may include a thermoplastic matrix 14 with a plurality of reinforcing fibers such as 16 and 18 held in the matrix 14. The fibers 16 and 18 may comprise a woven sheet of fabric-type reinforcing material. Alternatively, the fibers could be in the form of a random mat with relatively long fibers lying substantially flat in the plane of the sheet 10 in an otherwise random orientation.

As is apparent in FIG. 1, the reinforcing fibers 16 and 18 lie substantially parallel to the plane of the sheet 10. For purposes of ease of illustration of other features of the invention, the reinforcing fibers such as 16 and 18 of the layers 10 and 12 illustrated in FIG. 1 have not been illustrated in the remaining figures.

FIG. 2 illustrates the step of heating portions 20 and 22 of the first and second sheets 10 and 12 adjacent the interface 11. This is preferably accomplished by placing a heating element 24 of an ultrasonic heating gun 26 against an upper surface 28 of the upper thermoplastic sheet 10 to heat only a small area thereunder. The heating element 24 is held in place against sheet 10 for a sufficient time to heat portions 20 and 22, and then the heating element 24 is removed.

The heating of portions 20 and 22 may generally be described as heating the portions 20 and 22 sufficiently to soften them. If the particular material involved has a distinct melting point, it may be preferred, although not necessary, to heat that material to a temperature above its melting point.

Then as shown in FIG. 3, a length of thermoplastic fastener material 30, preferably having a sharpened lower end 32, is driven or positioned through the heated portions 20 and 22 of first and second articles 10 and 12. If one of the sheets, such as sheet 12, is metal or other non-plastic material, it may be necessary to form a hole in sheet 12 through which the fastener material 30 can be received; see, for example, the alternative embodiment of FIGS. 10 and 11 discussed below.

As illustrated in FIG. 3, the length of fastener material 30 is constructed from a thermoplastic matrix 34 having a plurality of substantially parallel reinforcing filaments 36 therein oriented parallel to the length of the fastener material 30 and continuous for the length of the fastener. It is preferable, but not necessary, that the thermoplastic matrix 34 of fastener material 30 be constructed of the same type of thermoplastic material as the sheets 10 and 12. It is noted that even when sheets 10 and 12 and fastener 34 use the same type of thermoplastic material, e.g., polyphenylene sulfide, there may be some variation in properties due to different forming processes to which the sheets and fastener material have been subjected.

As best seen in FIG. 6, which is a plan sectioned view taken along line 6—6 of FIG. 3, the length of material 30 is preferably cylindrical in shape and has a cross-sectional area slightly smaller than the heated areas 20 and 22.

As shown in FIG. 4, when utilizing the length of fastener material 30, the material 30 is then cut or otherwise severed on a side of the first and second sheets 10 and 12 opposite the sharpened end 32 to thus define a second end 38 of a severed fastener 40 extending through the first and second sheets 10 and 12. The fastener 40 can generally be referred to as a nail or rivet 40.

It is possible to terminate the process at this point allowing the heated portions 20 and 22 of the first and second articles to cool thereby securing the nail 40 in place as shown in FIG. 4. Due to the semi-molten state of the heated portions 20 and 22 when the nail 40 is first driven therethrough, an outer surface 42 of nail 40 will also be softened for a time so that upon cooling, the nail 40 is secured to the thermoplastic matrix material of sheets 10 and 12.

Particularly if the heated portions 20 and 22 have been heated to above the melting point of the thermoplastic matrix material of sheets 10 and 12, the outer surface 42 of nail 40 will generally also be melted so that there is actual fusion of the outer surface 42 of nail 40 of the thermoplastic matrix material of sheets 10 and 12.

It may thus be desirable in some instances that the plastic matrix 34 of the fastener material 30 have a lower melting or softening point than the material forming the matrix of the sheets 10 and 12. Also, it may be desirable to provide the fastener material 30 with a roughened outer surface for additional holding strength. The cooling can be accomplished reasonably quickly by allowing the sheets 10 and 12 to cool under ambient atmospheric conditions.

Although in many applications, the strength of the connection of sheets 10 and 12 provided by the nail 40 as shown in FIG. 4 may be sufficient, optionally the sharpened end 30 and second end 38 of nail 40 can be heated to soften them and then the ends 32 and 38 can be postformed to form enlarged rivet heads 44 and 46 which themselves will be fused to the sheets 10 and 12, respectively. The enlarged heads 44 and 46 may, for example, be formed with ultrasonically heated head-forming dies 48 and 50 seen in FIG. 5. The heating dies 48 and 50 are engaged with the ends 38 and 32 of nail 40 of FIG. 4 and pressure and heat are applied thereto to soften the ends 38 and 32 and then deform them to the shape shown in FIG. 5. Then the heating dies 48 and 50 are removed.

It will be appreciated that the process described above is readily adapted to an automated procedure for placing a plurality of fasteners like the fastener 40 through the sheets 10 and 12.

In one embodiment, the length of thermoplastic fastener material 30 would have its lower end which was severed from the fastener 40 resharpened, and then the ultrasonic heating device 26 would be moved to locally heat another area of the sheets 10 and 12 and the fastening process will be repeated.

The lower end of the length of fastener material 30 may be mechanically sharpened with a device such as a pencil sharpener or a rotary grinder.

The present invention has particularly been developed for use with very high strength, high temperature composite materials such as those constructed from a matrix of polymer material from the polyarylene sulfide family. Polyarylene sulfides are a family of aromatic sulfide polymers having the general formula $(AR-X-AR-S)_n$. The aromatic unit may be a mono or polycyclic moiety and X may be selected from at least one of the groups $O$, $S$, $SO_2$, $CO$, $OCO$, $NCHO$, etc. In general, these polymers are noted for their excellent chemical resistance, good thermal stability and physical strength.

The simplest member of the polyarylene sulfide family, which was utilized for the examples set forth below, is polyphenylene sulfide which consists of a polymer backbone of alternating distributed aromatic rings and divalent sulphur atoms. Polyphenylene sulfide is a commercial engineering thermoplastic resin that is semicrystalline in nature with a glass transition temperature of 85° C. and a crystalline melting point of 285° C.

The thermoplastic fastener 40 is preferably a carbon fiber or glass fiber reinforced pultruded member formed by pulling continuous tows of carbon fibers or glass fibers impregnated with powdered polyphenylene sulfide through a heated shaping die to consolidate the thermoplastic material and form the polyphenylene sulfide matrix 34 surrounding the carbon fiber reinforcing filaments 36. Preferably, the fastener material 30 has a carbon fiber content in a range of about 50 to about 75 weight percent. The individual fibers of the tows or filaments 36 will generally be continuous for the length of the fastener material 30, which may be many inches long. Methods of manufacturing fiber reinforced thermoplastic rods and other such structures are described in detail in pending U.S. patent application Ser. No. 584,418 filed Mar. 6, 1984, of James E. O'Connor, and assigned to the assignee of the present invention, the details of which are incorporated herein by reference.

Another member of the polyarylene sulfide family which is preferred for use with the present invention is polyphenylene sulfide sulfone. Polyphenylene sulfide sulfone can be produced in the manner described in U.S. Pat. No. 4,301,274 to Campbell, assigned to the assignee of the present invention. This is an amorphous material which does not have a distinct crystalline melting point. When the first and second articles 10 and 12 are constructed of polyphenylene sulfide sulfone, they are heated to a point sufficient to soften them so that the nail 40 can be driven therethrough. Preferably, polyphenylene sulfide sulfone sheets 10 and 12 would have the areas 20 and 22 heated to a temperature in the range of about 320° C. to about 370° C.

EXAMPLE NO. 1

First and second sheets 10 and 12 of stamped glass fiber reinforced polyphenylene sulfide material having a thickness of approximately 0.065 inch were placed adjacent each other as illustrated in FIG. 1. A pultruded carbon fiber reinforced polyphenylene sulfide rod having a diameter of ¼ inch was sharpened to a point at one end. Localized areas 20 and 22 having a diameter of approximately ⅜ inch were heated with an ultrasonic heating device until they were in a semi-molten softened state. The areas 20 and 22 were heated to a temperature in the range of about 300° C. to about 350° C. The heating device was then removed and the sharpened rod was driven through the heated areas 20 and 22 with a hammer. Upon cooling of the sheets 10 and 12, it was observed that the nail 40 was locked in place due to thermoplastic melting and resolidifying, i.e., fusion, at the contact of outer surface 42 of nail 40 with the sheets 10 and 12.

EXAMPLE NO. 2

A ¼-inch diameter carbon fiber reinforced pultruded polyphenylene sulfide rod like that described in Example No. 1 was sharpened to a point. An ultrasonic gun was used to locally heat an approximately ⅜-inch diameter area of a glass fiber reinforced polyphenylene sulfide composite sheet approximately 0.250 inch thick until it was softened. The sheet was heated to a temperature in the range of about 300° C. to 350° C. Upon removal of the ultrasonic heating device, this sharpened rod was driven through the heated area with a hammer and then cut off approximately ¼-inch above the surface of the sheet. The ultrasonic device was then used to melt the polyphenylene sulfide matrix in the protruding stub and the stub was then flattened and flared to make a circular head larger in diameter than the body of the rod. The same heating and flattening process was then carried out on the sharpened point protruding from the opposite side of the sheet. The rivet was fused to the sheet due to the thermoplastic melting and resolidifying of the cylindrical contacting surfaces of the rod and sheet. Additionally, the enlarged heads were fused to the upper and lower surfaces of the sheet.

ALTERNATIVE EMBODIMENTS OF FIGS. 7 AND 8

Alternatively, as illustrated in FIGS. 7 and 8, the fiber reinforced fastener material may be provided in the form of prefabricated nails or rivets 52 having a preformed enlarged diameter head 54 defined on one end thereof with a sharpened point 56 defined on the other end thereof.

Portions 20 and 22 of the sheets 10 and 12 are ultrasonically heated as previously described with regard to FIG. 2, and then the prefabricated fiber reinforced thermoplastic composite nail 52 is driven downward through the heated portions 20 and 22 as illustrated in FIG. 7 until the preformed head 54 abuts the upper surface 28 of sheet 10.

As previously described, an outer surface 58 of nail 52 will be fused to the sheets 10 and 12 at its surfaces of contact with the sheets 10 and 12 within the heated areas 20 and 22.

Subsequently, the sharpened lower end 56 of nail 52 can be heated to soften it, and then it can be deformed in a manner like that previously described with regard to FIG. 5 to postform an enlarged head 60 on the lower end thereof as illustrated in FIG. 8. The postformed enlarged head 60 will be fused to lower surface 62 of sheet 12.

ALTERNATIVE EMBODIMENT OF FIG. 9

Another alternative embodiment of the present invention is illustrated in FIG. 9 wherein a single sheet 10 of thermoplastic material has been attached to a non-thermoplastic underlying substrate 64, which may, for example, be a wooden substrate, with a thermoplastic nail 52 like that previously described with regard to FIG. 7.

The thermoplastic sheet 10 is placed against the substrate 64 and the portion 20 is heated with an ultrasonic device such as previously described with reference to FIG. 2.

Then the thermoplastic nail 52 having the preformed head 54 thereon like previously described with regard to FIG. 7 has its sharpened end 56 driven through the heated portion 20 of sheet 10 and into the underlying wooden substrate 64. Upon cooling of the heated portion 20, the thermoplastic article 10 is locked to the nail 52 by fusion thereof with the surface 58 of nail 52. Additionally, the enlarged head 54 of nail 52 mechanically holds the sheet 10 in place.

It will be appreciated that with this alternative embodiment, a nail such as the nail 40 without a preformed head thereon can be utilized and can satisfactorily attach the sheet 10 to the underlying substrate 64 even without the pre or postformation of an enlarged head on the nail 40, simply by the locking mechanism provided by fusion of surface 42 of the nail 40 with the heated area 20 of sheet 10.

ALTERNATIVE EMBODIMENT OF FIGS. 10 AND 11

One particular situation in which the present invention is useful is for joining a thermoplastic sheet to a metal sheet, such as aluminum or titanium, in an aircraft frame or similar application.

In FIG. 10, a thermoplastic first sheet 10 has been laid upon a metal second sheet 70 having an aperture 72 formed therethrough. Then the thermoplastic sheet 10 has had the small portion 20 heated with an ultrasonic device such as previously described with reference to FIG. 2.

Then the thermoplastic nail having the preformed head 54 thereon like previously described with regard to FIG. 7 has its sharpened end 56 driven through the heated portion 20 of sheet 10 and through the aperture 72 of metallic sheet 70. Upon cooling of the heated portion 20, the thermoplastic sheet 10 is locked to the nail 52 by fusion thereof with the surface 58 of nail 52.

The enlarged head 60 is then formed on the sharpened end of the nail 52 to hold the metallic sheet 70 in place against the thermoplastic sheet 10. Head 60 may be formed with the ultrasonically heated head forming die 50 of FIG. 5.

While all of the various embodiments of the invention discussed above have illustrated and discussed a solid thermoplastic sheet 10 which has a solid heated portion 20 through which the sharpened fastener is driven, it is also within the scope of the present invention to provide a preformed aperture (not shown) in the thermoplastic sheet 10 to function as a pilot hole. It is still contemplated that the thermoplastic sheet 10 would have the portion 20 thereof heated around the preformed pilot hole prior to driving or otherwise positioning the thermoplastic fastener through the pilot hole of the sheet 10.

Also, in the various embodiments discussed above, the fastener has been described in all instances as having a sharpened end that is driven through the thermoplastic sheets. It is within the scope of the present invention, however, to drive a non-sharpened end of the thermoplastic fastener through a heated portion of a thermoplastic sheet. It will be appreciated that sharpness is a question of degree, and the greater the extent to which the thermoplastic sheet has been softened by preheating, the less sharp the fastener needs to be before it can be driven through the softened thermoplastic sheet.

Thus it is seen that the articles and methods of the present invention readily achieve the ends and advantages mentioned as well as those inherent therein. While certain preferred embodiments of the invention have been illustrated and described for purposes of the present disclosure, numerous changes in the arrangement and construction of features and steps may be made by those skilled in the art which changes are encompassed within the scope and spirit of the invention as defined by the appended claims.

What is claimed is:

1. A method of joining thermoplastic articles, said method comprising the steps of:
   (a) placing a first thermoplastic article against a second thermoplastic article thereby defining an interface between said first thermoplastic article and said second thermoplastic article;
   (b) heating adjacent portions of said first thermoplastic article and said second thermoplastic article bordering the interface such that said portions are softened;
   (c) positioning a portion of a fastener having a first end and a second end in the heated portions of said first thermoplastic article and said second thermoplastic article, said fastener extending across the interface, said heated portions softening an outer surface of said fastener; and
   (d) cooling the heated portions of said first thermoplastic article and said second thermoplastic article to secure said fastener to said first thermoplastic article and said second thermoplastic article.

2. The method of claim 1, wherein:
   step (c) is further characterized in that said fastener comprises a fiber reinforced pultruded thermoplastic nail having a sharpened first end, and said thermoplastic nail is driven through the heated portions of said first thermoplastic article and said second thermoplastic article.

3. The method of claim 2, wherein:
   said thermoplastic nail comprises a polyarylene sulfide material.

4. The method of claim 3, wherein:
   said thermoplastic nail is reinforced by substantially parallel carbon fibers, such that the nail has a carbon fiber content in a range of about 50 to 75 weight percent.

5. The method of claim 4, wherein:
   said thermoplastic nail is reinforced by substantially parallel glass fibers, such that the nail has a glass fiber content in a range of about 50 to 75 weight percent.

6. The method of claim 4, wherein:
   said first thermoplastic article and said second thermoplastic article comprise a polyarylene sulfide material.

7. The method of claim 6, wherein:
   said polyarylene sulfide material of said first thermoplastic article and said second thermoplastic article and of said nail comprises polyphenylene sulfide.

8. The method of claim 7, wherein:
   step (b) is further characterized by heating to a temperature in a range of about 300° C. to about 350° C.

9. The method of claim 6, wherein:
   said polyarylene sulfide material of said first thermoplastic article and said second thermoplastic article and of said nail comprises polyphenylene sulfide sulfone.

10. The method of claim 9, wherein:
    step (b) is further characterized by heating to a temperature in a range of about 320° C. to about 370° C.

11. The method of claim 1, wherein:
    step (b) is further characterized as ultrasonically heating said portions.

12. The method of claim 1, wherein:
    step (c) is further characterized in that said fastener is elongated and has a transverse cross-sectional area; and
    step (b) is further characterized as locally heating relatively small adjacent portions larger than the transverse cross-sectional area of said fastener.

13. The method of claim 12 wherein step (b) includes the steps of:

contacting at least one of said portions with an ultrasonic heating device to heat said portions; and
then removing said heating device.

14. The method of claim 1, wherein:
step (d) is further characterized as cooling said heated portions under substantially ambient atmospheric conditions.

15. The method of claim 1, wherein:
step (c) is further characterized in that said fastener comprises a thermoplastic material and said fastener is positioned so that at least a first end portion thereof having said first end defined thereon protrudes from a surface of the first thermoplastic article; and
said method further comprises the step of:
(e) after step (c), heating said first end portion of said fastener sufficiently to soften the first end portion of said fastener and then postforming the softened first end portion into an enlarged head.

16. The method of claim 15, wherein:
step (e) is further characterized in that said enlarged head is fused to said first thermoplastic article.

17. The method of claim 15, wherein:
step (c) is further characterized in that said fastener is positioned so that a second end portion thereof having said second end defined thereon protrudes from a surface of said second thermoplastic article; and
said method further comprises the step of:
(f) after step (c), severing a first part of the second end portion from said fastener to define a second part of the second end portion protruding from the surface of the second thermoplastic article, then heating said second part of the second end portion of said fastener sufficiently to soften the second part of the second end portion, and then postforming the second part of the second end portion into a second enlarged head.

18. The method of claim 15, wherein:
step (c) is further characterized in that said fastener is positioned so that a second end portion thereof protrudes from a surface of the second thermoplastic article, said second end portion having a preformed enlarged head thereon defining said second end of said fastener.

19. The method of claim 1, wherein:
said fastener and said articles comprise the same type of thermoplastic material; and
step (d) is further characterized in that said fastener is fused to said first thermoplastic article and said second thermoplastic article.

20. A method of joining articles, said method comprising the steps of:
(a) placing a first article against a second article;
(b) providing a length of thermoplastic fastener material having a sharpened end;
(c) heating adjacent areas of said first article and said second article;
(d) driving the sharpened end of said length of fastener material through said first article and said second article so that the fastener material connects the first article with the second article, such that an outer surface of said fastener material is softened by heat from the heated areas of said first article and said second article;
(e) severing said length of fastener material on a side of said first article and said second article opposite said sharpened end, to thus define a second end of a severed rivet extending through said first article and said second article;
(f) after step (e), heating said sharpened end and said second end of said severed rivet to soften the ends of the severed rivet and then forming enlarged heads on both ends thereof; and
(g) repeating steps (b)–(f) as necessary with the same or a different length of thermoplastic material to provide a plurality of thermoplastic rivets joining said first article and said second article.

21. The method of claim 20, wherein:
said length of fastener material comprises a plurality of substantially parallel reinforcing fibers in a matrix of thermoplastic material.

22. The method of claim 21, wherein:
said thermoplastic material comprises a polyarylene sulfide material.

23. The method of claim 20 wherein:
step (a) is further characterized in that said first article is a thermoplastic first article, and said second article is a thermoplastic second article.

24. The method of claim 23, wherein:
step (d) is further characterized as driving said sharpened end through said heated portions of said first thermoplastic article and said second thermoplastic article.

25. The method of claim 20, wherein:
step (c) is further characterized as locally heating relatively small adjacent portions larger in cross-sectional area than a transverse cross-sectional area of said length of fastener material.

26. The method of claim 25, wherein step (c) includes steps of:
contacting at least one of said portions with an ultrasonic heating device to heat said portions; and
then removing said heating device.

* * * * *

UNITED STATES PATENT AND TRADEMARK OFFICE
CERTIFICATE OF CORRECTION

PATENT NO. : 4,761,871
DATED : August 9, 1988
INVENTOR(S) : James E. O'Connor and William B. Beaulieu It is certified that error appears in the above-identified patent and that said Letters Patent are hereby corrected as shown below:

Abstract, line 12, delete "looked" and insert --locked-- therefor.

Column 4, line 16, delete "of" and insert --to-- therefor.

Claim 5, line 1, delete "4" and insert --3-- therefor.

Claim 6, line 1, delete "4" and insert --3-- therefor.

Signed and Sealed this

Seventh Day of February, 1989

Attest:

DONALD J. QUIGG

Attesting Officer     Commissioner of Patents and Trademarks